United States Patent
Murdock, IV et al.

(10) Patent No.: US 12,443,788 B2
(45) Date of Patent: Oct. 14, 2025

(54) AUTOMATED DOCUMENT HARVESTING AND REGENERATING BY CROWDSOURCING IN ENTERPRISE SOCIAL NETWORKS

(71) Applicant: International Business Machines Corporation, Armonk, NY (US)

(72) Inventors: James William Murdock, IV, Amawalk, NY (US); Radha Mohan De, Howrah (IN); Sneha Srinivasan, San Jose, CA (US); Mary Diane Swift, Rochester, NY (US); Caesar Chatterjee, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 371 days.

(21) Appl. No.: 18/062,344

(22) Filed: Dec. 6, 2022

(65) Prior Publication Data

US 2024/0184981 A1    Jun. 6, 2024

(51) Int. Cl.
G06F 40/186    (2020.01)
G06F 40/30    (2020.01)
G06V 30/412    (2022.01)

(52) U.S. Cl.
CPC ............ *G06F 40/186* (2020.01); *G06F 40/30* (2020.01); *G06V 30/412* (2022.01)

(58) Field of Classification Search
None
See application file for complete search history.

(56) References Cited

U.S. PATENT DOCUMENTS

| | | | |
|---|---|---|---|
| 6,487,310 B1 * | 11/2002 | Bishop | G07C 9/35 382/187 |
| 7,716,581 B2 | 5/2010 | Tran | |
| 8,819,542 B2 | 8/2014 | Cudich et al. | |

(Continued)

OTHER PUBLICATIONS

Rowley, "Using case studies in research." Management research news (2002).

(Continued)

*Primary Examiner* — Bhavesh M Mehta
*Assistant Examiner* — Joseph J. Yamamoto
(74) *Attorney, Agent, or Firm* — Amin, Turocy & Watson, LLP

(57) ABSTRACT

Various systems and methods are presented regarding automatically generating a document for a particular topic, and further utilizing an algorithm to automatically identify information in a resource that pertains to the topic. The document can be a purpose-specific document, created by a template configured to combine data fields to build the document. Each data field can be subject-matter specific with an associated algorithm. The algorithm can be trained to recognize and extract content that potentially meets the subject matter of the data field. The data field can be populated with the content. Subsequent editing of the content populating the data field can be monitored to determine an effectiveness of the algorithm to identify data of interest in the data repository. In the event of low success, the algorithm can be retrained. Further, the document can be regenerated if an algorithm is retrained, new information added to the repository, etc.

20 Claims, 11 Drawing Sheets

(56) References Cited

U.S. PATENT DOCUMENTS

| | | | |
|---|---|---|---|
| 9,286,403 | B2 | 3/2016 | Papa et al. |
| 9,311,357 | B2 | 4/2016 | Ramesh et al. |
| 9,317,498 | B2 | 4/2016 | Baker et al. |
| 9,372,858 | B1 * | 6/2016 | Vagell .................. G06F 40/166 |
| 10,599,721 | B2 | 3/2020 | Mani et al. |
| 10,936,827 | B1 * | 3/2021 | Gupta .................... G06F 40/45 |
| 2014/0258832 | A1 | 9/2014 | Hepp et al. |
| 2019/0377652 | A1 * | 12/2019 | Sahoo ................. G06F 11/3447 |
| 2022/0075929 | A1 | 3/2022 | Booth et al. |
| 2022/0405499 | A1 * | 12/2022 | Amin .................. G06V 30/414 |
| 2023/0061725 | A1 * | 3/2023 | Khan ..................... G06F 16/93 |
| 2023/0401430 | A1 * | 12/2023 | Zheng ................. G06N 3/0455 |
| 2024/0095853 | A1 * | 3/2024 | Wollstadt ........... G06Q 10/0838 |

OTHER PUBLICATIONS

Sampson et al., "Reusable Learning Resources: Building a Metadata Management System Supporting Interoperable Learning Object Repositories." In Rory McGreal (Editor), Online Education Using Learning Objects, Taylor & Francis Books Ltd. (2004).

Widom, "Research problems in data warehousing." Proceedings of the fourth international conference on Information and knowledge management. 1995.

Finelli et al, "Development of a Taxonomy of Keywords for Engineering Education Research." Journal of Engineering Education 104.4 (2015): 365-387.

Karimkhany Kourosh. "Extract Purchase Order Information Using IBM Watson Compare & Comply", Medium, Mar. 27, 2019, 7 pages.

* cited by examiner

AUTOMATED DOCUMENT HARVESTING AND REGENERATING BY CROWDSOURCING IN ENTERPRISE SOCIAL NETWORKS

BACKGROUND

The present invention relates to purpose-specific documents, and more specifically, to the generation of purpose-specific documents. Purpose-specific documents are utilized across the globe by both private sector and public sector entities. Such documents are typically created using a standard format or template. For example, cybersecurity incident reports can include data fields such as severity, time-to-resolution, attack source, attack focus, contributing factors, reasons for closure, documentation used, etc. Information to be included into a respective data field can be extracted from a variety of information and data sources including enterprise social networking tools, document repositories, code repositories, and the like.

Other examples of purpose-specific document types include process documentation, product safety reports, root-cause analysis (RCA) reports, software architecture documentation, product change requests, government forms such as Securities and Exchange Commission (SEC) forms, etc. These documents all have a well-defined structure that can be embodied in a template. Such documents are often needed to comply with regulations such as HIPAA or GDPR, or meet the requirements for certifications such as ISO 9001 or SOC2. If the documents are not completed on-time and/or they are found to be missing crucial content, a business may be faced with a financial penalty and/or legal action.

The above-described background is merely intended to provide a contextual overview of some current issues and is not intended to be exhaustive. Other contextual information may become further apparent upon review of the following detailed description.

SUMMARY

The following presents a simplified summary of the disclosed subject matter to provide a basic understanding of one or more of the various embodiments described herein. This summary is not an extensive overview of the various embodiments. It is intended neither to identify key or critical elements of the various embodiments nor to delineate the scope of the various embodiments. The sole purpose of the Summary is to present some concepts of the disclosure in a streamlined form as a prelude to the more detailed description that is presented later.

In one or more embodiments described herein, systems, devices, computer-implemented methods, methods, apparatus and/or computer program products are presented to facilitate training of one or more algorithms configured to automatically extract information pertaining to a topic to populate one or more data fields in a document generated in accordance with the topic. Subsequent editing of the extracted information can be monitored to determine how accurately the algorithm extracted the information versus the information that was available to be extracted. Based upon the determined accuracy of the algorithm, the algorithm can be retrained to improve the accuracy. Further the document can be regenerated in the event of, for example, the algorithm is retrained, further information becomes available for the algorithm to potentially extract new information from, and such like.

According to one or more embodiments, a system can be utilized, wherein the system comprises at least one processor, and a memory coupled to the at least one processor and having instructions stored thereon, wherein, when executed by the at least one processor, the instructions facilitate performance of operations, comprising monitoring editing of information presented in a data field included in an electronically generated document, wherein the presented information was identified by an algorithm configured to identify information from at least one source pertaining to a topic of the data field. In a further embodiment, the operations can further comprise determining, from the editing of the information, an accuracy of the algorithm to identify information pertaining to the topic in the at least one source. In an embodiment, the at least one source can be an email, a social media conversation, an electronic direct message, an online discussion of the topic, a document repository, a code repository, an enterprise social network, financial data, or health data.

In a further embodiment, the operations can further comprise comparing the editing of the information with a threshold, wherein a measure below the threshold can indicate minimal editing of the information has been conducted and the algorithm accurately identified information pertaining to the topic from the one or more sources. In another embodiment, a measure above the threshold can indicate extensive editing of the information has been conducted and the algorithm failed to accurately identify information pertaining to the topic from the one or more sources.

In a further embodiment, the operations can further comprise storing the edits made to the document. In another embodiment, in response to determining the information underwent extensive editing, the algorithm can be retrained using training data created from the stored edits made to the document.

In another embodiment, the data field can be included in a set of data fields and the set of data fields combine to form the document in accordance with the topic. In a further embodiment, the set of data fields can be automatically combined to create the document in response to selection of the topic. In another embodiment, the set of data fields can be selected and combined in accordance with a template configured to create the document in accordance with the topic.

In an embodiment, the document can be a purpose-specific document. The document can be any one of a cybersecurity incident report, a safety report, a product safety report, a root-cause analysis (RCA) report, a software architecture documentation, a product change request, a Securities and Exchange Commission (SEC) report, or a document having a well-defined structure.

In another embodiment, a data field(s) can be included in the document generated in response to selection of the topic and the data field can be included in a second document generated in response to selection of a second topic, wherein subject matter of the topic and subject matter of the second topic are disparate.

In a further embodiment, the operations can comprise, prior to generating the document, the algorithm can be trained using data extracted from documents previously identified as pertaining to the topic. In a further embodiment, the training data can be information comprising at least one of: (a) how often a source is utilized to fill the data field, (b) semantic similarity between a topic and text in a source, (c) an author associated with the topic, (d) relation between an entity entering the topic and an entity editing the information, or (c) difference between time a source was created and a time the data field was created.

In a further embodiment, the operations can further comprise, in response to determining at least one new source of information not included in the one or more sources has information pertaining to the topic, re-running the algorithm to extract further information for inclusion in the data field.

In other embodiments, elements described in connection with the disclosed systems can be embodied in different forms such as a computer-implemented methods, computer program products, or other forms. For example, in another embodiment, a computer implemented method can be utilized for generating a document, wherein the method can comprise monitoring, by a device comprising a processor, an amendment made to information included in a data field, the data field is included in a document pertaining to a topic and the information was extracted by an algorithm configured to identify the information from at least one source pertaining to the topic. In a further embodiment, the method can further comprise determining accuracy of the algorithm to identify the information based on the magnitude of the amendment made to the information included in the data field.

Further embodiments can include a computer program product stored on a non-transitory computer-readable medium and comprising machine-executable instructions, wherein when executed, the machine-executable instructions can cause a machine to perform operations, comprising creating a digital document pertaining to a topic, wherein the document comprises a collection of data fields. In a further embodiment, the operations can further comprise applying an algorithm to at least one information source, wherein the algorithm is configured to identify information in the at least one information source that pertains to the topic. The operations can further comprise populating a first data field in a digital document with the identified information, wherein the data field can pertain to the topic and the digital document can comprise a subset of data fields including the first data field. In a further embodiment, the operations can further comprise monitoring editing of information populating the first data field. The operations can further comprise determining an accuracy of the algorithm to identify the information based on a magnitude of editing performed on the information in the first data field. In another embodiment, the operations can further comprise, in response to determining the algorithm inaccurately identifies information in the at least one information source pertaining to the topic, retraining the algorithm to improve identification of information pertaining to the topic in the at least one information source.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Figure 1:
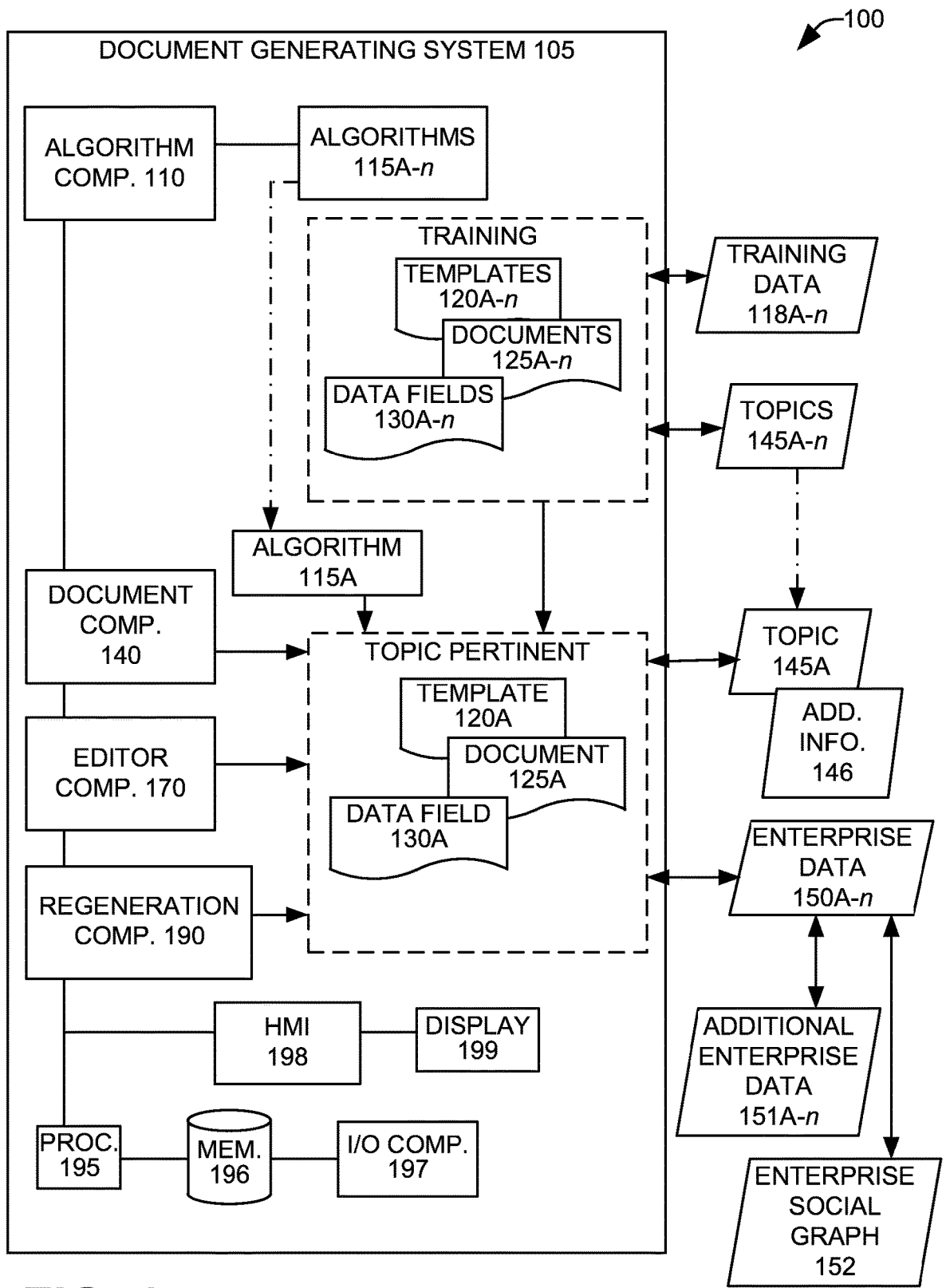
FIG. 1 is a diagram illustrating a system comprising various components configured to automatically generate documents and further automatically populate the documents with information extracted from a repository of pertinent sources, in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is to be appreciated, however, that the various embodiments can be practiced without these specific details, e.g., without applying to any particular networked environment or standard. In other instances, well-known structures and devices are shown in block diagram form in order to facilitate describing the embodiments in additional detail.

A purpose-specific document can often be generated in accordance with a standard template, wherein the template can be used to create documents with common data fields. Accordingly, the templates and subsequent document generation can pertain to a particular topic, e.g., cybersecurity incident, process documentation, safety reports, SEC filings, etc. Authoring the content from scratch can be extremely time consuming and easy to overlook crucial information that should be included in a purpose-specific document. Important content that should appear in the documents (e.g., in the respective data fields) may already be available in an enterprise social networking tool, a document repository, a code repository, and the like, etc. Drafters of a document can review all of these various enterprise sources to identify and extract information pertaining to the particular topic of the document. However, as mentioned, important information can be missed by the drafter.

The various embodiments presented herein relate to automatically generating an initial draft of a document and automatically identifying/extracting information from various sources for incorporation into the document, wherein the draft content can be subsequently reviewed and edited to improve information presented in the initial draft document. In another embodiment, in the event of additional content being added to the sources, the edited document can be regenerated to incorporate any additional content. In comparison with a manually generated document, the various embodiments presented herein, can expedite creation of the document and the incorporation of information into the document. Further, the various embodiments presented herein can reduce a risk of pertinent and/or vital content being overlooked, and thus omitted, from a document.

The various embodiments include (1) training one or more algorithms/model to recognize content that meets the requirements of each data field in a document template, (2) when generation of a new document is required, harvesting a first draft of the document by applying the model to content available in various enterprise sources, (3) enabling an entity to manually edit the document and monitoring the edits, (4) further training the model in view of the edits performed, and (5) proposing subsequent content updates as newer and/or newly found content is added to the repository of enterprise sources.

As used herein, n is any positive integer.

Turning to the figures, FIG. 1 presents a system 100 comprising various components configured to automatically generate documents and further automatically populate the documents with information extracted from a repository of pertinent sources, in accordance with one or more embodiments described herein.

Briefly reviewing the various components presented in FIG. 1, in an embodiment, a document generating system (DGS) 105 can be configured to harvest and regenerate purpose-specific documents from pre-existing sources. The DGS 105 can execute prospective content mining from a basic template for purpose-specific documents and further apply a model to determine what content to include in the output. The DGS 105 can include an algorithm component 110, whereby the algorithm component 110 can be configured to generate and train various algorithms 115A-n (also known as a recognition model comprising a single algorithm or a collection of algorithms). The DGS 105 can further include a document component 140 configured to generate one or more documents 125A-n pertaining to a topic (e.g., topic 145) in a collection of topics 145A-n, wherein a document 125A can comprise one or more data fields 130A-n, compiled by various templates 120A-n. The data fields 130A-n can be populated with information extracted from various sources, enterprise data 150A-n, by an algorithm 115A. The documents 125A-n can initially be generated by the document component 140 and, for example, when finalized, subsequently printed in hard copy form. The DGS 105 can also include an editor component 170 configured to monitor edits made to a document 125A and further determine an accuracy of the algorithm 115A in determining content of interest to be extracted from the sources 150A-n. The algorithm 115A can be retrained and/or the document 125A regenerated when new information, additional enterprise data 151A-n, becomes available.

As shown in FIG. 1, the DGS 105 can include a processor 195 and a memory 196, wherein the processor 195 can execute the various computer-executable components, functions, operations, etc., presented herein. The memory 196 can be utilized to store the various computer-executable components, functions, code, etc., as well as algorithms 115A-n, templates 120A-n, documents 125A-n, data fields 130A-n, training data 118A-n, topics 145, additional information 146, enterprise data 150A-n, additional enterprise data 151A-n, enterprise social graph 152, extracted-data, edited-data, etc. (as further described herein). As further shown, the DGS system 105 can include an input/output (I/O) component 197 configured to enable transmission of information (e.g., training data, enterprise data, topics, reports, instructions, data, and the like) between the DGS 105 and any external system(s) hosting any of the training data 118A-n, topic 145, additional information 146, enterprise data 150A-n, additional enterprise data 151A-n, enterprise social graph 152, and the like.

In an embodiment, the DGS 105 can further include a human-machine interface 198 (HMI) which can be configured to present various information including algorithms 115A-n, templates 120A-n, documents 125A-n, data fields 130A-n, training data 118A-n, topics 145, additional information 146, enterprise data 150A-n, additional enterprise data 151A-n, enterprise social graph 152, extracted-data, edited-data, etc. (as further described herein), per the various embodiments presented herein. The HMI 198 can include an interactive display 199 to present the various information via various screens presented thereon.

1. Algorithm Training Phase

As mentioned, the algorithm component 110 can be configured to train various algorithms 115A-n to recognize content pertaining to a particular topic (e.g., topic 145A), wherein the topic can pertain to a subject matter of a purpose-specific report (e.g., a cybersecurity incident report). In an embodiment, the respective topics of interest can be captured in various template(s) 120A-n, wherein the various templates can be utilized to generate various documents 125A-n, and each respective document can be compiled from a collection of available data fields 130A-n. Data fields 130A-n can include data topics that are utilized across a number of templates 120A-n and/or documents 125A-n, e.g., a data field 130A is incorporated into a document 125A generated in response to a first topic (e.g., topic 145A) and is also incorporated into a document 125B generated in response to a second topic (e.g., topic 145B), wherein the first topic and second topic are disparate. In another example, a data field (e.g., data field 130A) may be specific to one particular template (e.g., template 120A) and a specific document created therefrom (e.g., document 125A). Depending upon the scope of an algorithm, one algorithm may be configured to extract information pertaining to a collection of data fields included in a document, or one algorithm 115A may be configured to extract information to populate a specific data field 130A, hence a group of algorithms 115A-n can be utilized to populate information in a document 125A, where the document 125A comprises a collection of data fields 130A-n, with each respective data field being populated by a respective algorithm.

Training of an algorithm, e.g., algorithm 115A, can entail applying the algorithm to training data 118A-n, wherein the training data can include various example documents, e-mails, online discussions, etc., that pertain, or potentially pertain, to a topic of interest to which the algorithm 115A pertains.

Depending upon the scope of an algorithm, the algorithm can be configured to identify content in the training data 118A-n that pertains to the topic of interest for a data field 130A, for a document 125A, and/or for a template 120A. In a situation where the algorithm 115A is concerned with cybersecurity, the training data 118A-n can include a captured online discussion that occurred at around the time of a cybersecurity incident, involves persons named identified as being involved, or having an interest in the cybersecurity incident, and such like. The algorithm 115A itself can be configured to include keywords and/or snippets of content pertaining to the topic of interest for which the algorithm 115A has been configured. Accordingly, the algorithm 115A is applied to the content from the online discussion and identify whether the content includes alphanumerics, text, words, phrase snippets, and the like, that match or are semantically similar to the text, keywords, or content of interest to the algorithm 115A. For example, the algorithm 115A is configured to measure semantic similarity between words in the example recorded discussion in training data 118A-n with the words configured in the algorithm 115A. If a high semantic similarity exists between the example recorded discussion or words/snippets extracted from the recorded discussion, then the discussion and/or words/snippet is tagged as being a positive example of content that could be entered into the data field, and accordingly, for a document generated by the template associated with the data field. Furthering the cybersecurity incident example, if the online discussion includes an incident that is sufficiently similar to a sentence in the "contributing factors" data field of the cybersecurity incident report, then the online discussion is identified (e.g., tagged) as a positive example for the "contributing factors". The accuracy of the algorithm 115A can then be assessed based upon the information extracted from the training data 118A-n, and, if needed, further configured until the algorithm 115A is achieving a desired level of accuracy in identifying and extracting information. Hence, the respective algorithms 115A-n can be trained for each data field 130A-n in each template 120A-n, and any documents 125A-n generated by a respective template.

In another embodiment, content in the training data 118A-n can be pre-processed such that a content snippet that pertains to a particular topic can be labelled as a positive example of information for that topic. Alternatively, a content snippet that does not pertain to the topic can be labelled as a negative example of information for that topic. In an embodiment, the accuracy of the algorithm 130A can be determined based upon the amount of positive information and negative information it identifies as pertaining to the topic and for inclusion in the data field 130A.

In an embodiment, the algorithms 115A-n can be trained as part of a recognition model for each data field 130A-n using the labels included in a data field 130A-n (using machine learning enabling art such as deep neural networks or support vector machines). In an embodiment, the recognition model can be a multi-class model in which there is one class for each data field 130A-n plus an additional class corresponding to none of the data fields 130A-n. In some embodiments, a multi-class model can be an ensemble of multiple models (e.g., one binary classifier for each field). In other embodiments, a multi-class model can be a single model (e.g., a deep neural network with multiple outputs, which can share some or all of the layers preceding those outputs).

2. Document Harvesting Phase

While this phase pertains to any of the algorithms 115A-n, templates 120A-n, documents 125A-n, and/or data fields 130A-n, to facilitate understanding the following description is presented as the document harvesting phase pertains to a single algorithm, algorithm 115A.

In an embodiment, the document component 140 can receive a topic 145A of interest for which a document is to be created, e.g., input via an interactive display 199 presented on HMI 198, or via an external system communicatively coupled to I/O component 197. In response to the received topic 145A, the document component 140 can be configured to select a template, e.g., template 120A, that has been configured in accordance with the topic 145A. Here advantage is made of the various documents of interest having a well-defined structure that can be embodied in a template, as previously mentioned. The template 120A can generate a document 125A, wherein the document comprises a collection of data fields 130A-n that combine to form the document, whereby a data field in the collection of data fields 130A-n can have an algorithm associated therewith to populate the data field with data, e.g., data field 130A is associated with algorithm 115A.

Continuing the previous example, the topic 145A can be a cybersecurity incident, and based thereon, a cybersecurity template, template 120A, can be selected. In an embodiment, the various templates 120A-n can be presented on the interactive display 199 from which template 120A can be selected. In another embodiment, the template 120A can be known and its associated identifier (e.g., a topic ID) can be entered in combination with the topic 145A. In a further embodiment, the document component 140 can be configured to select the template 120A based upon the entered topic 145A in conjunction with any other information that may be received with the topic 145, e.g., incident type, report type, report version type, etc. Accordingly, document component 140 selects document 125A, a cybersecurity incident report, with data field 130A pertaining to cybersecurity for which the algorithm 115A is configured to extract information pertaining thereto. In an embodiment, the data field 130A can be pre-populated with particular terms that can be applied to the topic-related algorithm 115A, such that the algorithm 115A can utilize the pre-configured terms in the data field 130A to identify information in the enterprise data 150A-n. Further, additional information 146 can be received by the documentation component 140, e.g., structured information such as date(s) of the incident, time(s) of the incident, location of equipment involved in the incident, equipment involved in the incident, persons involved in the incident, etc. The additional information can be applied to the topic-related algorithm 115A, wherein the algorithm 115A can now be applied to the enterprise data 150A-n.

The algorithm 115A is configured to identify and extract content from the enterprise data 150A-n that pertains the topic 145A. For example, based on the training of the algorithm 115A, the algorithm can provide a confidence rating to information identified. A confidence rating of 1 can be provided with information that the algorithm identifies as being pertinent but an association between the content the algorithm is configured to find and the found content (e.g., a semantic association) is weak, while a confidence rating of 5 can be given to content that the algorithm identifies as being strongly associated with content it is configured to identify. Accordingly, during the editing phase of a document, the confidence rating can be utilized to indicate to an editor of the document confidence of a source providing the content, and also to act as a further assessor of the accuracy of an algorithm. For example, the algorithm 115A flags content with a strong level of confidence that it pertains to the topic 145A of interest, but during editing of the document, the content is heavily edited, or even deleted, which can be an indicator that the algorithm 115A requires retraining to improve its accuracy.

As previously mentioned, enterprise data 150A-n can comprise of a collection of documents, information, emails, financial data, health data, incident data, social media interactions, interactions across an organization, etc. In a manner similar to that used to train the algorithm 115A, the algorithm 115A is configured to recognize/match text, words, etc., (e.g., pre-configured terms in the data field 135A, additional information 146, structured information, etc.) available to the algorithm 115A regarding content in the enterprise data 150A-n. The algorithm 115A is configured to populate the data field 130A with any of the text, etc., that the algorithm has identified and extracted from the enterprise data 150A-n as pertaining to the data field 130A. In an embodiment, the respective information extracted to populate the data field 130A can include links/identifiers to the source of the extracted information, enabling the extracted information and its source to be subsequently reviewed during review of the data field 130A as part of the incorporation of the data field 130A in the document 125A.

Hence, expanding the concepts presented in relation to algorithm 115A, a group of data fields 130A-n can be populated with information extracted from the enterprise data 150A-n that the various algorithms 115A-n identify. The information populated data fields 130A-n can be combined to create the respective document(s) 125A-n in accordance with the respective template(s) 120A-n in response to the received topic 145 and additional information 146. Accordingly, a template (e.g., template 115n) can deploy one or more algorithms 115A-n to form a recognition model to identify and extract information from the enterprise data 150A-n to the data fields 130A-n in the topic-related document 125n. As mentioned, any information extracted from the enterprise data 150A-n to populate the respective data fields 130A-n can be presented in the document 125n with links identifying the source of the information in the enterprise data 150A-n.

3. Document Edit Phase &
4. Algorithm Retraining Phase

As previously mentioned, the DGS 105 can be configured to include an Editor Component 170 which can be configured to monitor editing of the document, e.g., document 125A, as generated during the previously described document harvesting phase. In an embodiment, the editor component 170 can be configured to monitor any edits/updates conducted on the document 125A, as required to create a document that is complete, accurate, and coherent based upon the available enterprise data 150A-n.

As a function of the one or more embodiments presented herein, the document edit phase should be less time-consuming and/or onerous than reviewing a document populated by conventional means, e.g., manually inserting information into the document, as the respective algorithms 115A-n will have pre-populated the data fields 130A-n. Hence, per the various embodiments presented herein, the data fields 130A-n will have been populated with a considerable amount of relevant information in the document harvesting phase.

In an embodiment, editing of the document 125A can be conducted by the entity who initiated creation of the document 125A, e.g., entered the topic 145 into the document component 140. In another embodiment, the editor component 170 can be configured to distribute the document 125A between a group of entities, wherein each entity may have a specific specialty pertaining to one or more of the data fields 130A-n.

In a further embodiment, the editor component 170 can be configured to monitor edits made to the document 125A, and based thereon, can be further configured to make one or more inferences regarding the accuracy of the algorithm 115A to identify information in the enterprise data 150A-n pertaining to a respective data field in the data fields 130A-n combined to form the document 125A. As further described, as a function of the inferred accuracy of the algorithm 115A, the algorithm 115A can be retrained to improve its accuracy in identifying pertinent information in the enterprise data 150A-n.

In another embodiment, as previously mentioned, the algorithms 115A-n can be configured to label any information identified in the enterprise data 150A-n with a degree of confidence that information identified, extracted, and now populating a data field 130A, pertains to the topic 145. In an embodiment, a color of a data field presented on the display 199 can indicate level of confidence tagged by the algorithm, e.g., red is low confidence, green is high. A numerical identifier can be used, e.g., 1=low confidence, 5=high confidence. The degree of confidence applied by the algorithm and the subsequent degree of editing a data field undergoes can be used to identify the accuracy of an algorithm, e.g., algorithm tags information found as a 5 (high confidence of pertaining to topic 145A) but the information is subsequently heavily edited. An entity editing the document/data field can provide feedback, e.g., even though the algorithm indicated a confidence level of 5, the reviewer changes the level of applicability to the topic to a 2. This adjustment can also be based on the reviewer accessing the document identified in the enterprise data 150A-n as the source of the extracted information, and determines the document does not pertain to the topic.

5. Document Regeneration Phase

In an embodiment, the document component 140 can be further configured to monitor the enterprise data 150A-n used during the document harvesting phase. In an embodiment, in the event of additional documents, etc., (e.g., additional enterprise data 151A-n) being available to supplement the enterprise data 150A-n, e.g., a new chain of emails pertaining to the incident are identified, the document component 140 can be configured to regenerate the document 125A. In an embodiment, the document component 140 can "re-run" the document 125A, such that the various algorithms 115A-n associated with the respective data fields 130A-n can be reapplied to the enterprise data 150A-n and additional enterprise data 151A-n. In the event of the additional enterprise data 151A-n being identified as pertinent to the one or more data fields 130A-n as a function of the various algorithms 115A-n, the extracted information can be added automatically to the respective data fields 130A-n. In an embodiment, in the event of one or more data fields 130A-n are updated with additional information, the respective entity monitoring generation of the document 125A and/or update of data fields 130A-n can be alerted to the addition of information so that subsequent editing of the newly added information can be performed, as required. Based upon the additional information, the algorithms 115A-n can be further retrained as needed, as previously described. In a further embodiment, the various data fields 130A-n can be respectively identified as being important (prioritized) and not important (lower priority or can be ignored), such that as additional enterprise data 151A-n is received, only the prioritized data fields 130A-n and their associated algorithms have to be run against the newly added information.

Training, Data Identication, Data Extraction, Data Editing

Returning to training of an algorithm and ability to identify pertinent information, as previously mentioned, the algorithms 115A-n can be applied to the respective data fields 130A-n in a document 125A-n generated by respective templates 120A-n. The algorithms 115A-n are respectively trained using information in training data 118A-n, wherein the training data comprises training documents that comply with a topic of a template 120A-n and content from various enterprise sources that may be relevant to the subject matter of the templates 120A-n and documents 125A-n. In an embodiment, for each data field 130A-n, the respective algorithms 115A-n can utilize a data pair comprising a topic (i.e., both the topic description and the structured information that the user provides) and a content snippet from the enterprise sources. Each algorithm 115A-n is trained to predict whether the content snippet in the training data 118A-n belongs in that particular data field 130A-n.

In a non-limiting list, the following are examples of features and concepts that can be utilized during training of the algorithms 115A-n with training data 118A-n, and subsequently when the respective algorithms 115A-n are being used to identify and extract information from the enterprise data 150A-n/additional enterprise data 151A-n to populate the data fields 130A-n:

(a) The keywords, text, etc., in both the topic (e.g., topic 145) and the training data. Each may be encoded using word embeddings (in which each word is represented by a number that encodes its meaning). A domain specific word embedding algorithm can be trained if existing embeddings do not represent the content to a satisfactory level.

(b) A count of how many times content from a source (e.g., in training data 118A-n, enterprise data 150A-n, additional enterprise data 151A-n) has been used to fill a respective data field 130A-n, in a document 125A-n, and/or a template 120A-n.

(c) A count of how many times content from a source (e.g., in training data 118A-n, enterprise data 150A-n, additional enterprise data 151A-n) has been used to fill semantically similar data fields 130A-n in other similar documents 125A-n and/or a templates 120A-n. Similarity between respective documents and templates can be identified using any suitable technique, e.g., via document similarity metrics.

(d) The length of the content snippet from that source (e.g., in training data 118A-n, enterprise data 150A-n, additional enterprise data 151A-n).

(e) Whether any of the entities described in the structured information 146 submitted with the topic 145 authored the content snippet in the source (e.g., in training data 118A-n, enterprise data 150A-n, additional enterprise data 151A-n).

(f) Whether any of the entities described in the structured information 146 submitted with the topic 145 accessed the content snippet in the source (e.g., in training data 118A-n, enterprise data 150A-n, additional enterprise data 151A-n).

(g) Whether there are any named entities (e.g., people, places, companies) that appear in both the content snippet and the text description of a topic.

(h) Whether there are any named entities (e.g., people, places, companies) that appear in both the content snippet in the source (e.g., in training data 118A-n, enterprise data 150A-n, additional enterprise data 151A-n) and the structured information 146 about a topic.

(i) Whether the sentiment of the content snippet in the source (e.g., in training data 118A-n, enterprise data 150A-n, additional enterprise data 151A-n) is positive, negative, or neutral (which can be determined using any suitable sentiment analysis technique).

(j) text in a label in a template or data field matches a content snippet in the source (e.g., in training data 118A-n, enterprise data 150A-n, additional enterprise data 151A-n).

(k) Distance in an enterprise social graph 152 between an entity described in the structured information 146 submitted with the topic 145 and the entity who authored the content snippet (e.g., in training data 118A-n, enterprise data 150A-n, additional enterprise data 151A-n).

(l) Distance in an enterprise social graph 152 between an entity described in the structured information 146 submitted with the topic 145 and the entity who edited the content snippet in the document 125A-n.

(m) The difference between the last edit timestamp of the content snippet (e.g., in training data 118A-n, enterprise data 150A-n, additional enterprise data 151A-n) and one or more times and dates specified in the structured information 146.

(n) The difference between the last access timestamp of the content snippet (e.g., in training data 118A-n, enterprise data 150A-n, additional enterprise data 151A-n) and one or more times and dates specified in the structured information 146.

(o) The difference between the timestamp the content snippet was created (e.g., in training data 118A-n, enterprise data 150A-n, additional enterprise data 151A-n) and the times specified in the structured information 146.

As noted above, some of these features require an enterprise social graph 152 that links entities (e.g., entities across a business, enterprise, social media, etc.). In an embodiment, such a graph can be generated from an organizational chart (e.g., as is often encoded in an employee database) and/or from enterprise social media, e.g., enterprise social graph 152, which reveals actual social interactions when one entity replies to a message from another entity, an inference can be made to link two entities.

In a further embodiment, the editor component 170 can be configured to present the one or more templates 120A-n, documents 125A-n, and/or data fields 130A-n as configurable graphical representation (e.g., via HMI 198, display 199) to manipulate how a document (e.g., document 125A) is arranged such that a manually created version of the document can be generated from the document automatically generated by the template (e.g., template 120A).

Figure 2:
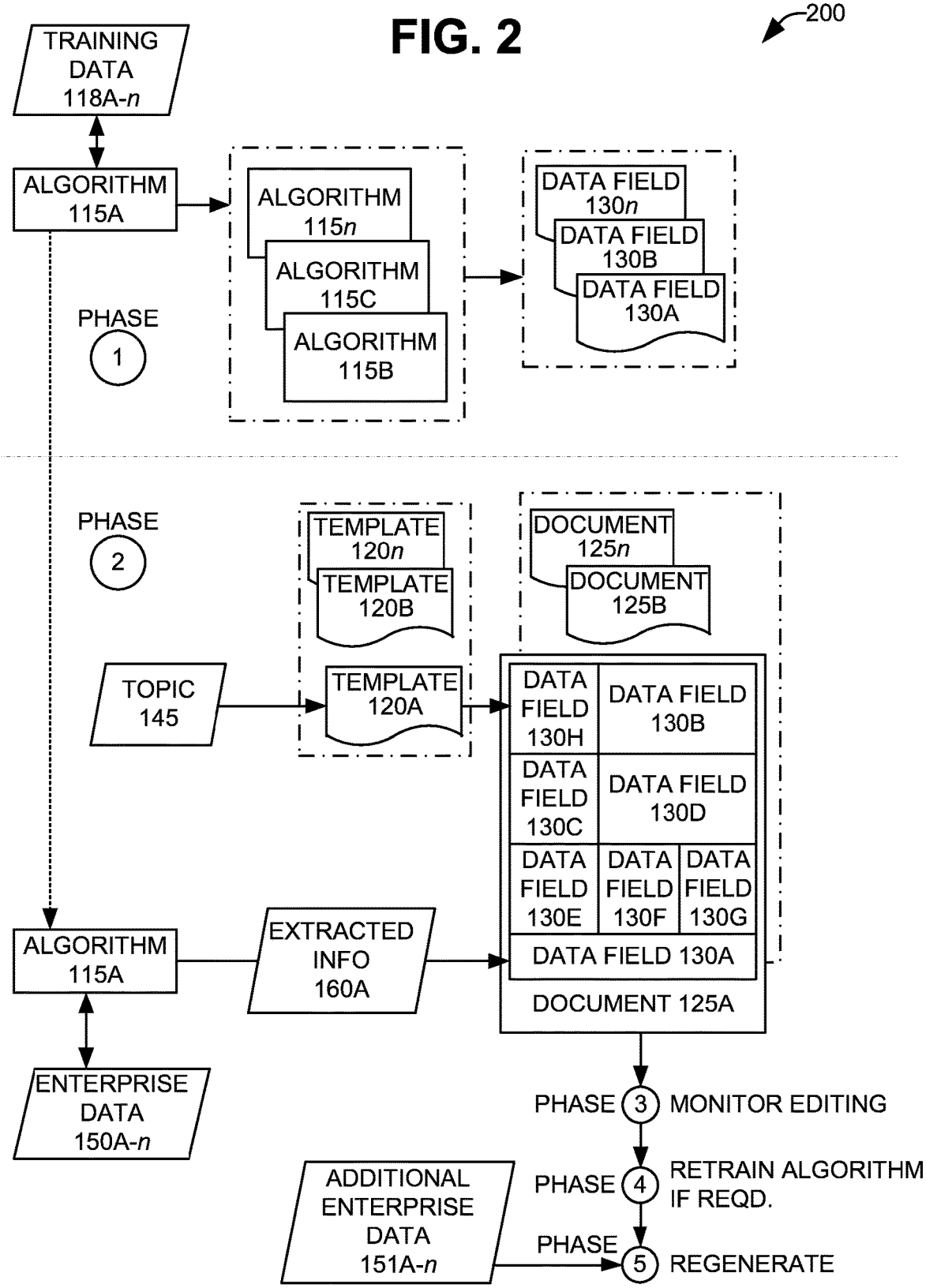
FIG. 2 is a diagram illustrating a system comprising various templates, documents, data fields, algorithms, etc., and their interaction, in accordance with one or more embodiments described herein.

FIG. 2, system 200, presents various templates, documents, data fields, algorithms, etc., and their interaction, in accordance with one or more embodiments described herein.

FIG. 2 illustrates two phases relating to algorithm training (denoted in FIG. 2 as phase 1) and document generation (denoted in FIG. 2 as phase 2). While not expanded upon in FIG. 2, the various embodiments presented herein also include a document editing phase and monitoring thereof (denoted in FIG. 2 as phase 3), an algorithm retraining phase (denoted in FIG. 2 as phase 4), and a document regeneration phase (denoted in FIG. 2 as phase 5).

As shown in FIG. 2, during phase 1, various algorithms 115A-n can be trained using training data 118A-n. For example, an algorithm 115A can be trained with the training data 118A-n. Further, the various algorithms 115A-n can be associated with one or more data fields 130A-n. Each of the data fields 1130A-n can be configured to a particular subject matter. E.g., continuing the cybersecurity incident example, the data field 130A can be associated with any information pertaining to equipment involved in the cybersecurity incident (e.g., servers, data centers, etc.), data field 130B can be associated with any information pertaining to a date/time at which the cybersecurity incident occurred, data field 130n can be associated with any information pertaining to the scope of the cybersecurity incident (e.g., applications affected), etc.

Per FIG. 2, during phase 2, a document pertaining to a particular subject of interest can be generated. As shown, various templates 120A-n can be configured to respectively generate one or more documents 125A-n. Further, each of the documents 125A-n can be formed from one or more data fields 130A-n. The templates 120A, documents 125A-n, and data fields 130A-n can be associated based on respective topics/subjects of interest. For example, as shown in FIG. 2, a topic 145 and a template 120A have a common subject matter of interest, e.g., cybersecurity incident. In an embodiment, in response to entry of a topic 145, an associated template can be selected that pertains to the topic, wherein the topic is configured to generate a document pertaining to the topic. As further shown in FIG. 2, entry of topic 145 triggers activation of template 120A, wherein template 120A is configured to create document 125A comprising data fields 130A-H. Algorithm 115A, as previously trained in phase 1, can be associated with data field 130A and configured to identify and extract information 160A from the enterprise data 150A-n, as previously described. The respective data fields 130A-H can be configured such that they are populated with information from respective algorithms 115A-n associated therewith, wherein an algorithm is configured to apply information pertaining to the respective data field.

As further shown in FIG. 2, upon population of information in the respective data fields 130A-n by the associated algorithm 115A-n, editing of the document can be monitored (phase 3), the respective algorithm retrained, if required (phase 4), and the document regenerated, if required (phase 5).

Figure 3:
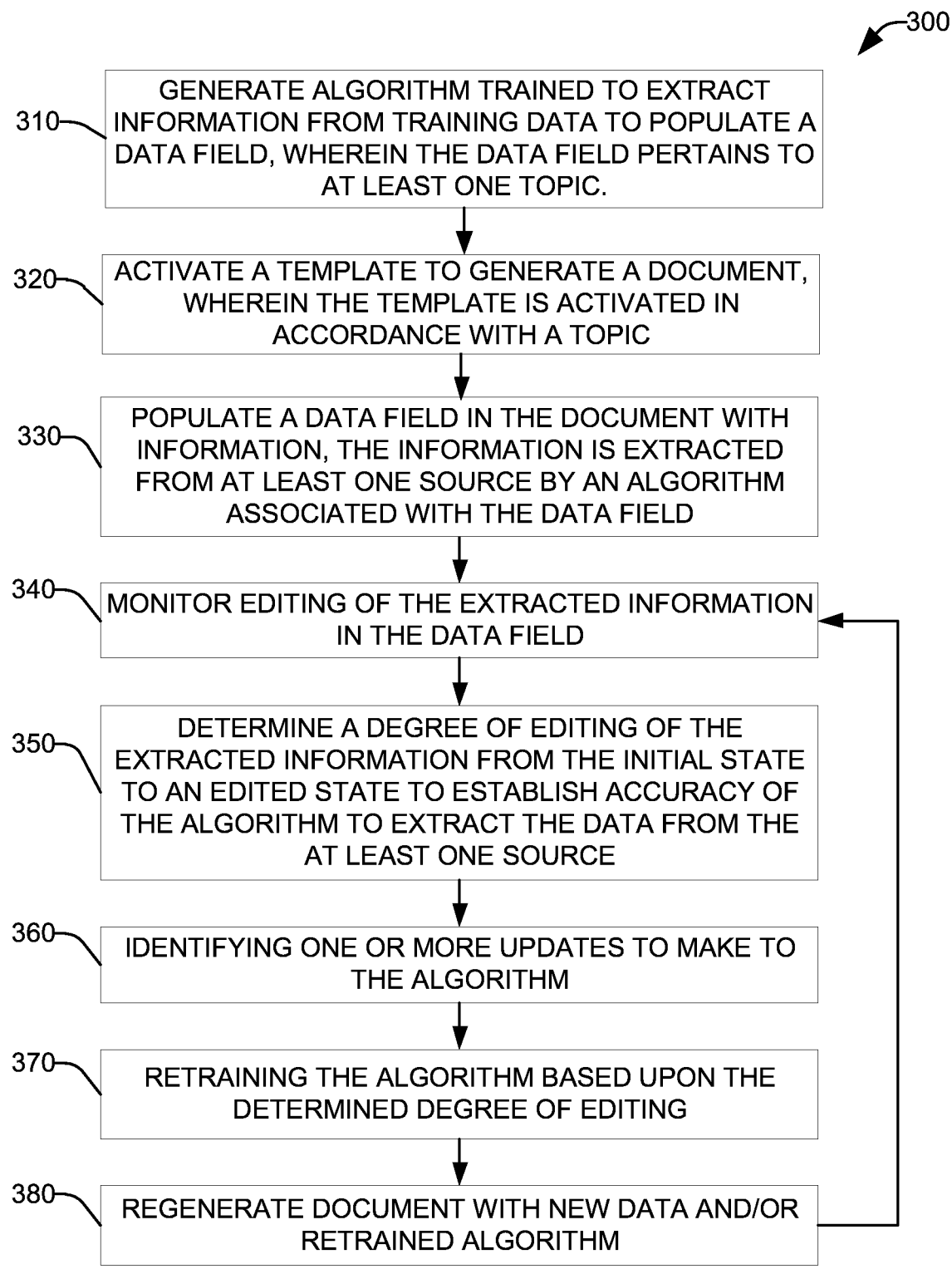
FIG. 3 is a flow diagram of a non-limiting computer implemented method for document harvesting and regeneration, in accordance with one or more embodiments described herein.

FIG. 3 presents a methodology 300 for document harvesting and regeneration, in accordance with one or more embodiments described herein.

At 310, an algorithm (e.g., algorithm 115) can be generated to extract information from training data (e.g., training data 118A-n) to populate a data field (e.g., data field 130A), wherein the data field pertains to at least one topic. The data field can be assigned to a subject matter template (e.g., template 120A), wherein the template can be configured to generate a document (e.g., document 125A) pertaining to the subject matter, as further described herein.

At 320, a template can be activated in response to receiving entry of a topic (e.g., topic 145). Entry of a topic can cause selection of the template from a collection of templates (e.g., by document component 140), wherein the selected template has a subject matter theme that most closely matches the received topic. The template can be further configured to generate a document, wherein the document pertains to the subject matter of the topic. As shown in FIG. 2, the document can comprise of a collection of data fields (e.g., data fields 130A-n), where each of the data fields has been associated with an algorithm (e.g., data field 130A and algorithm 115A) trained to populate the data field with information, per step 310.

At 330, the algorithm associated with a data field can be applied to a repository of data/information (e.g., enterprise data 150A-n) relating to a global topic, e.g., cybersecurity issues, which potentially includes the topic of interest, e.g., a cybersecurity incident on a specific date/time. The algorithm can be configured (e.g., in conjunction with the document component 140) to identify information of interest in the repository, flag the information of interest in the repository, extract and populate the data field with the information of interest, and for the information extracted to the data field, indicate in the data field the source of the information in the data repository.

At 340, editing of the information in the data field can be monitored (e.g., by editor component 170), e.g., has the information in the data field been heavily amended? or essentially left in the form it was in when extracted from the repository? Does a confidence level assigned to the extracted information by the algorithm match a level of relevancy assigned to the extracted information by a person reviewing the extracted information in a particular data field?

At 350, based on the monitoring of the editing, the accuracy of the algorithm utilized to identify and extract the information can be determined.

At 360, in the event of the algorithm is determined to require retraining, one or more issues affecting the accuracy of the algorithm can be identified.

At 370, the algorithm can undergo retraining, wherein the retraining can be performed based upon already available training data (e.g., training data 118A-n), information available in the repository (e.g., enterprise data 150A-n), and any additional information (e.g., additional enterprise data 151A-n) that may become available after the document (e.g., document 135A) was generated, per step 320.

At 380, the document (e.g., document 135A) can be regenerated, wherein regeneration can include:
(a) applying the retrained algorithm to the information available in the repository (e.g., enterprise data 150A-n),
(b) applying the retrained algorithm to newly available information (e.g., additional enterprise data 151A-n), and/or
(c) applying the algorithm, which hasn't undergone retraining, on the newly available information (e.g., additional enterprise data 151A-n).

Based upon the information extracted at 380, if required, methodology 300 can return to step 340.

Figure 4:
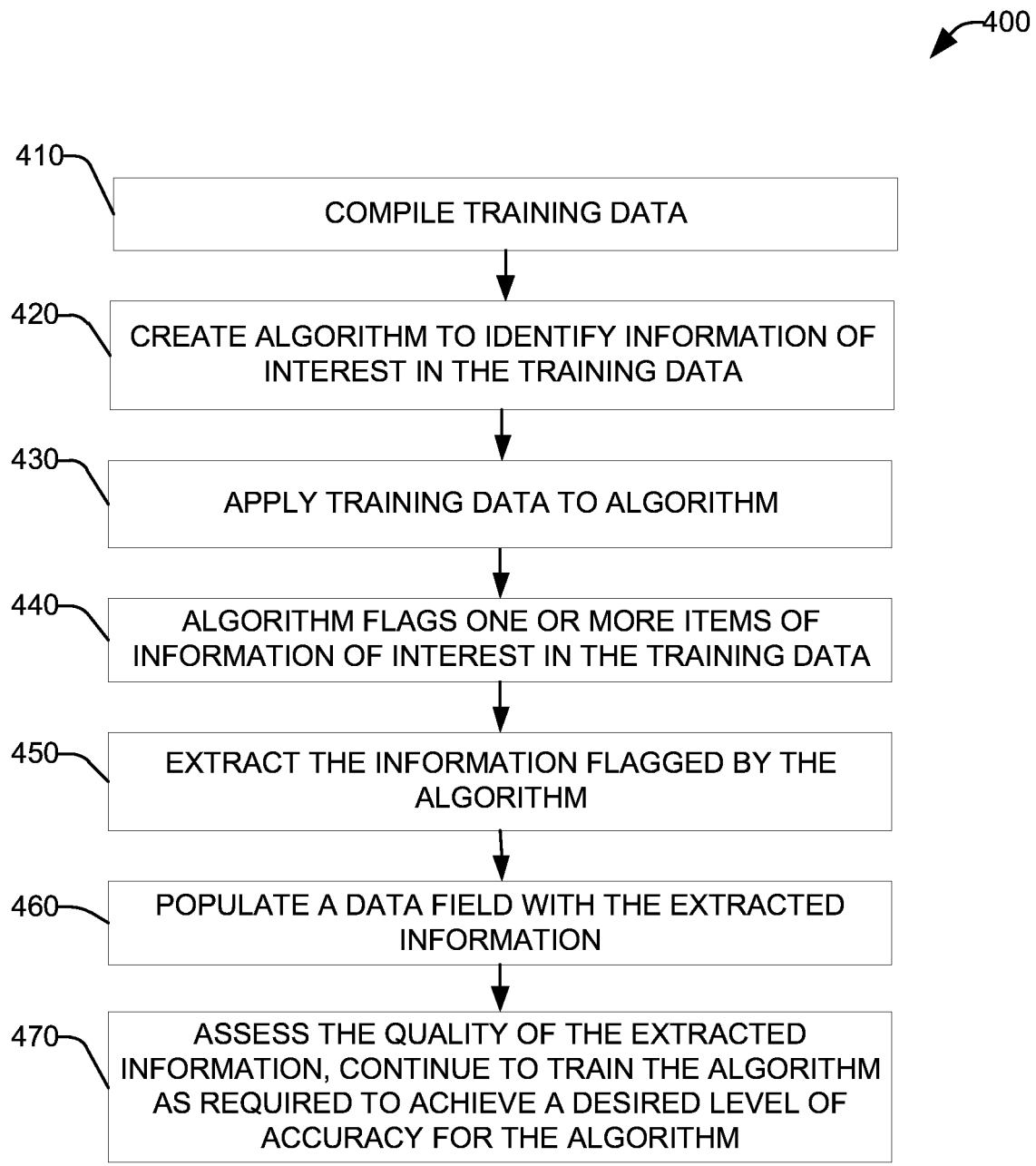
FIG. 4 is a flow diagram of a non-limiting computer implemented method for training an algorithm configured to identify and extract information pertaining to a topic, in accordance with one or more embodiments described herein.

FIG. 4 presents a methodology 400 for training an algorithm configured to identify and extract information pertaining to a topic, in accordance with one or more embodiments described herein.

At 410, training data (e.g., training data 118A-n) is compiled, e.g., from documents, emails, correspondence, and the like. The training data can potentially pertain to one or more topics or subject matter for which information is to be identified.

At 420, an algorithm (e.g., algorithm 115A) is created, wherein the algorithm is configured to identify and extract information pertaining to a topic of interest. The topic can be a subject matter which a data field (e.g., data field 130A) is configured to present, wherein the data field can be subsequently incorporated into a document (document 125A) that includes one or more data fields.

At 430, the algorithm can be applied to the training data.

At 440, during application of the algorithm to the training data, the algorithm identifies one or more items of interest in the training data that pertain to the subject matter of concern to the data field.

At 450, the information identified by the algorithm can be extracted.

At 460, the data field can be populated with the extracted information.

At 470, the quality of the extracted information by the algorithm is assessed. For example, was a known portion of information in the training data identified by the algorithm? The algorithm can be continued to be trained until the extracted information has a desired degree of accuracy.

Figure 5:
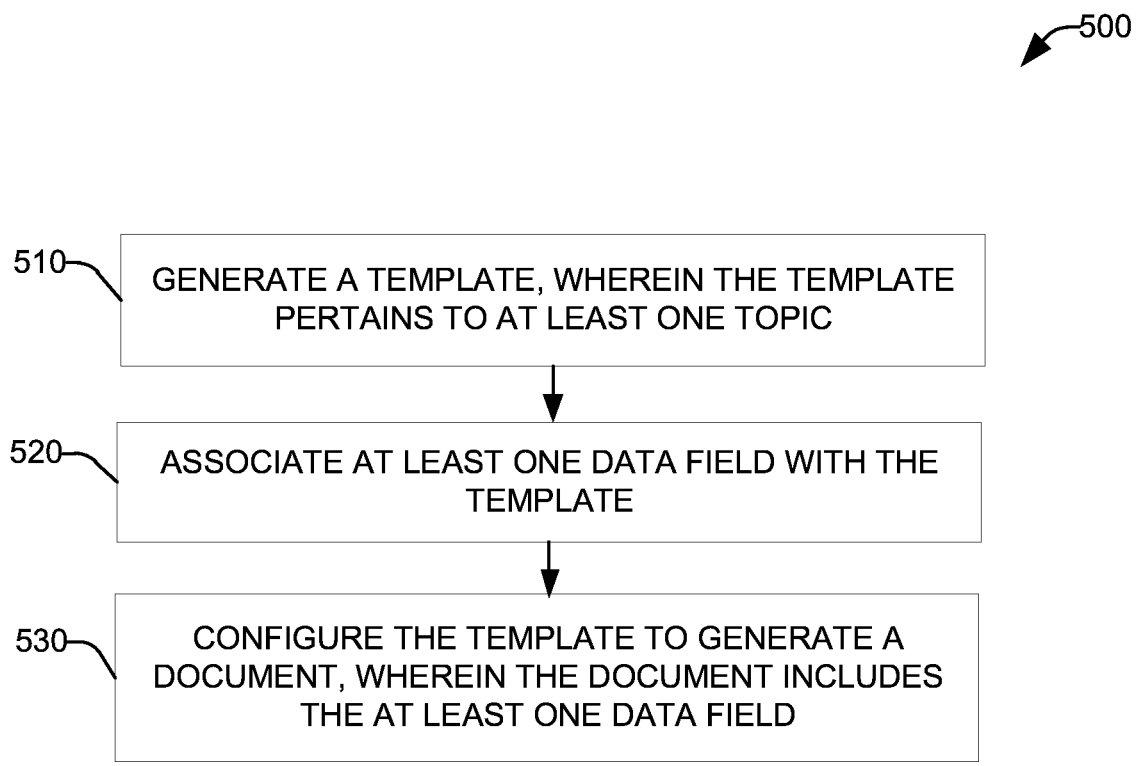
FIG. 5 is a flow diagram of a non-limiting computer implemented method for configuring a template to generate a document comprising one or more data fields relating to a topic, in accordance with one or more embodiments described herein.

FIG. 5 presents a methodology 500 for configuring a template to generate a document comprising one or more data fields relating to a topic, in accordance with one or more embodiments described herein.

At 510, a template (e.g., template 120A) can be generated, wherein the template pertains to a topic or subject matter (e.g., topic 145).

At 520, at least one data field (e.g., data field 130A) can be assigned to the template.

At 530, the template can be further configured to generate a document (e.g., document 125), wherein the document includes the at least one data field. The document can comprise of a plurality of data fields combined to form the document (e.g., as shown in FIG. 2).

Figure 6:
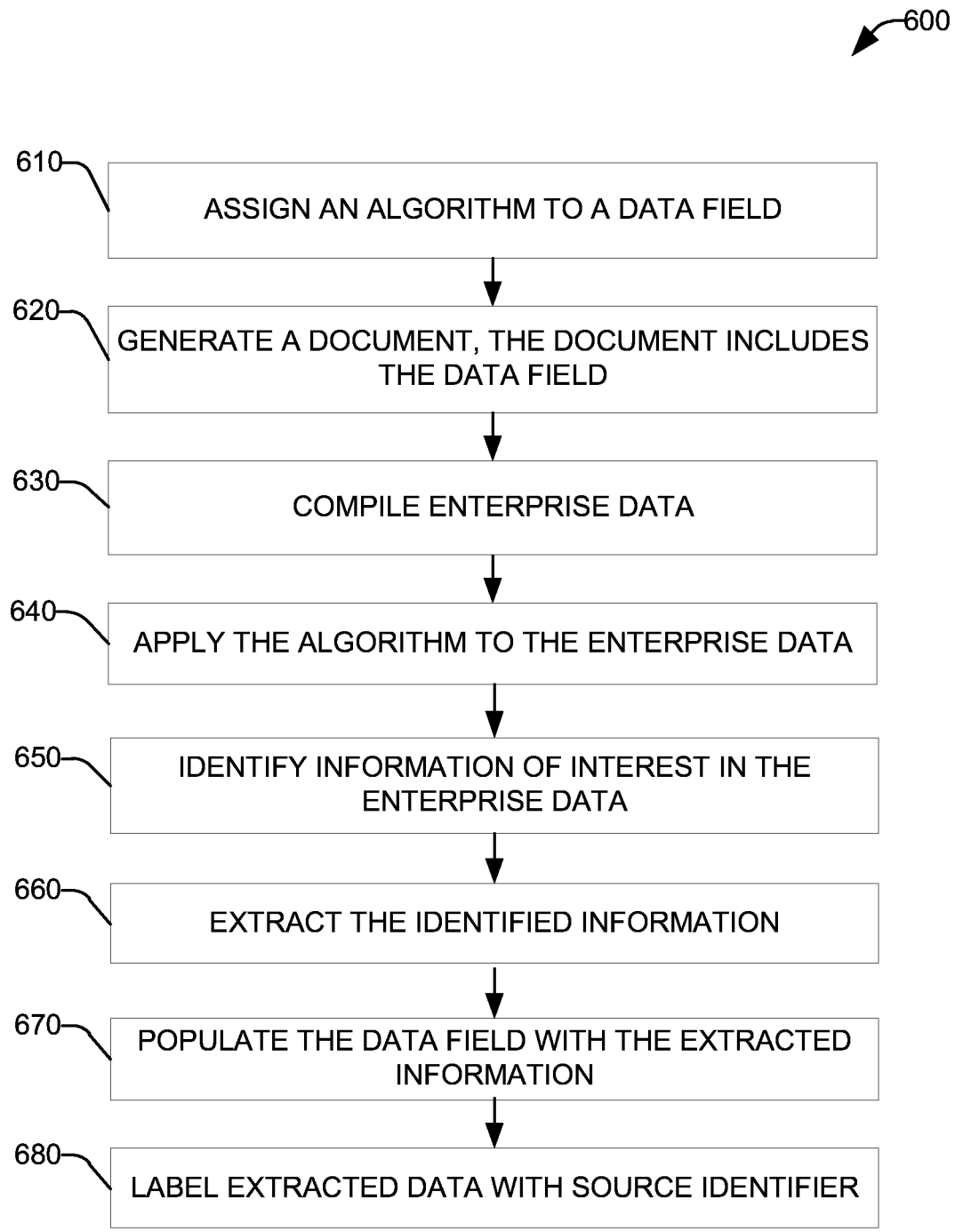
FIG. 6 is a flow diagram of a non-limiting computer implemented method for identifying and extracting information for inclusion in a data field, in accordance with one or more embodiments described herein.

FIG. 6 presents a methodology 600 for identifying and extracting information for inclusion in a data field, in accordance with one or more embodiments described herein.

At 610, an algorithm (e.g., algorithm 115A) can be assigned to a data field (e.g., data field 125A). The data field can be created to be populated with specific information, e.g., an entity name, financial data, health data, incident data, and the like, wherein the algorithm 115A can be configured to identify information pertaining to the specific focus of the data field.

At 620, a document (e.g., document 120A) can be generated that includes the data field. The document can comprise of a plurality of data fields combined to form the document (e.g., as shown in FIG. 2).

At 630, enterprise data (e.g., enterprise data 150A-n) can be compiled, wherein the enterprise data comprises: documents, emails, financial data, etc.

At 640, the algorithm is applied to the enterprise data, wherein the algorithm is configured identify and extract information topical to the algorithm and the data field.

At 650, the algorithm identifies information of interest in the enterprise data, wherein the information of interest is applicable to the subject matter of data field.

At 660, the identified information can be extracted from the enterprise data.

At 670, the data field can be populated with the extracted information.

At 680, the extracted information can be populated in the data field accompanied by an identifier indicating a particular source for the extracted information in the enterprise data. Further, the extracted information can have a level of confidence assigned to it by the algorithm, e.g., based on semantic similarity between terms and phrases the algorithm is configured to identify and the extracted information.

Figure 7:
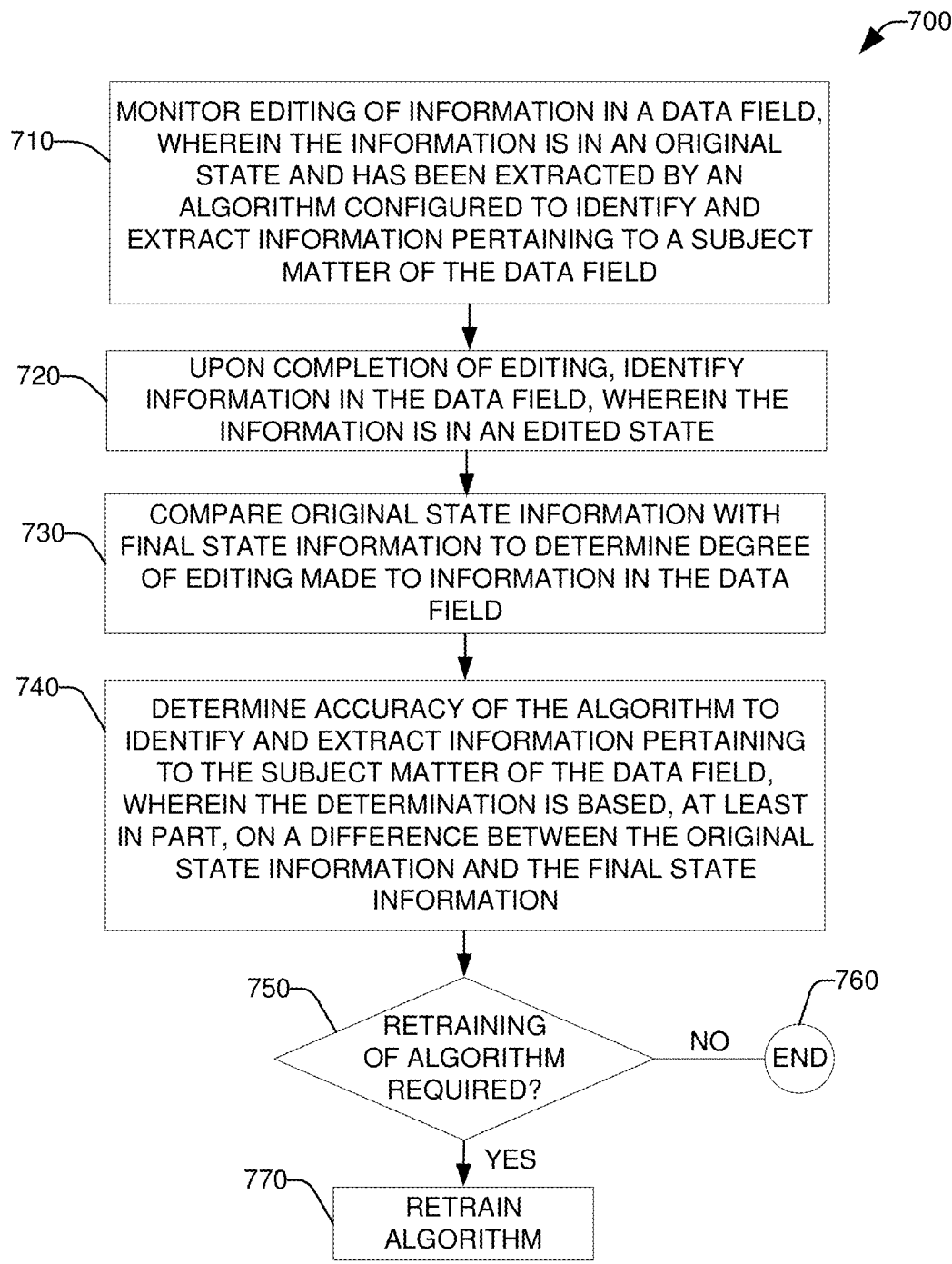
FIG. 7 is a flow diagram of a non-limiting computer implemented method for determining an effectiveness of an algorithm to identify information in enterprise data as a function of a degree of editing conducted on information identified and extracted from the enterprise data by the algorithm, in accordance with one or more embodiments described herein.

FIG. 7 presents a methodology 700 for determining an effectiveness of an algorithm to identify information in enterprise data as a function of a degree of editing conducted on information identified and extracted from the enterprise data by the algorithm, in accordance with one or more embodiments described herein.

At 710, editing of information in a data field (e.g., data field 130A) can be conducted, wherein the information in the data field has been identified and extracted by an algorithm (e.g., algorithm 115A) configured to identify and extract information from an information repository based upon a subject matter focus (e.g., topic 145) of the data field. Prior to the editing, information extracted and populating the data field is in an extracted (original) state. The information in its extracted state can be stored (e.g., in memory 196).

At 720, upon completion of editing of the information extracted and populating the data field, the information is in an edited state. The information in its edited state can be stored (e.g., in memory 196).

At 730, the extracted-state information can be compared with the edited-state information to determine a degree of editing that the extracted-state information underwent during the editing process. The degree of editing can be determined based upon any suitable criteria/metric/threshold, e.g., did the amount of editing exceed an anticipated/expected amount?, was the amount of editing less than a threshold amount?, did the amount of editing equal a threshold amount?, and the like. In an embodiment, a measure below the threshold indicates minimal editing of the information has been conducted and the algorithm accurately extracted information pertaining to the topic from the one or more sources. In another embodiment, a measure above the threshold indicates extensive editing of the information has been conducted and the algorithm failed to accurately extract information pertaining to the topic from the one or more sources. A three-tier approach can be utilized: a minor modification can be assessed as a positive review (e.g., the reviewer implicitly approved the extracted information by keeping it mostly unchanged), a major modification can be labelled as a negative review (e.g., the reviewer implicitly rejected the extracted information by replacing it, heavily editing it), a moderate modification is not labelled (e.g., the reviewer did not provide a clear signal regarding the extracted information).

At 740, based on the degree of editing of the extracted-state information, a determination can be made regarding the ability of the algorithm to identify and extract information pertaining to the subject matter of the data field. As mentioned, the determination can be a function of the degree of transformation (e.g., similarity, lack of similarity) between the information in its extracted state and the information in its edited state. The ability of the algorithm to identify information can be assessed based upon a confidence level the algorithm assigns to the extracted information and a level of pertinence a reviewer of the extracted information assigns, and the difference between the top assessments.

At 750, as a function of determining the ability of the algorithm to identify and extract information pertaining to the subject matter of the data field, the algorithm can be retrained, as required. In the event of the algorithm is performing successfully, a determination can be made that NO, the algorithm does not require retraining/further training, and methodology 700 can end, per 760.

At 750, in response to determining that YES, the algorithm requires further development (training) to improve its ability to identify and extract information pertaining to the data field, the methodology 700 can advance to 770 for further development of the algorithm.

In an embodiment, where newly labelled data is inferred from a reviewer's manual edits and assessments of pertinence, the newly labelled data can be used to retrain the algorithms (e.g., algorithms 115A-n). In a further embodiment, the retraining can include collecting all of the training data and enterprise data and concatenating the data to form a larger training data set, and then reperforming the training of the respective algorithms. In an alternative embodiment, an incremental approach can be utilized with retraining being performed with the newly available information. In a further embodiment, a weighting system can be utilized based upon reviewer feedback such that while an algorithm may give the extracted data a value of 5, the reviewer may only give the extracted data a value of 3, wherein the user value should be weighted based on the fact that the reviewer value was provided by a human reviewer and not an algorithm.

Figure 8:
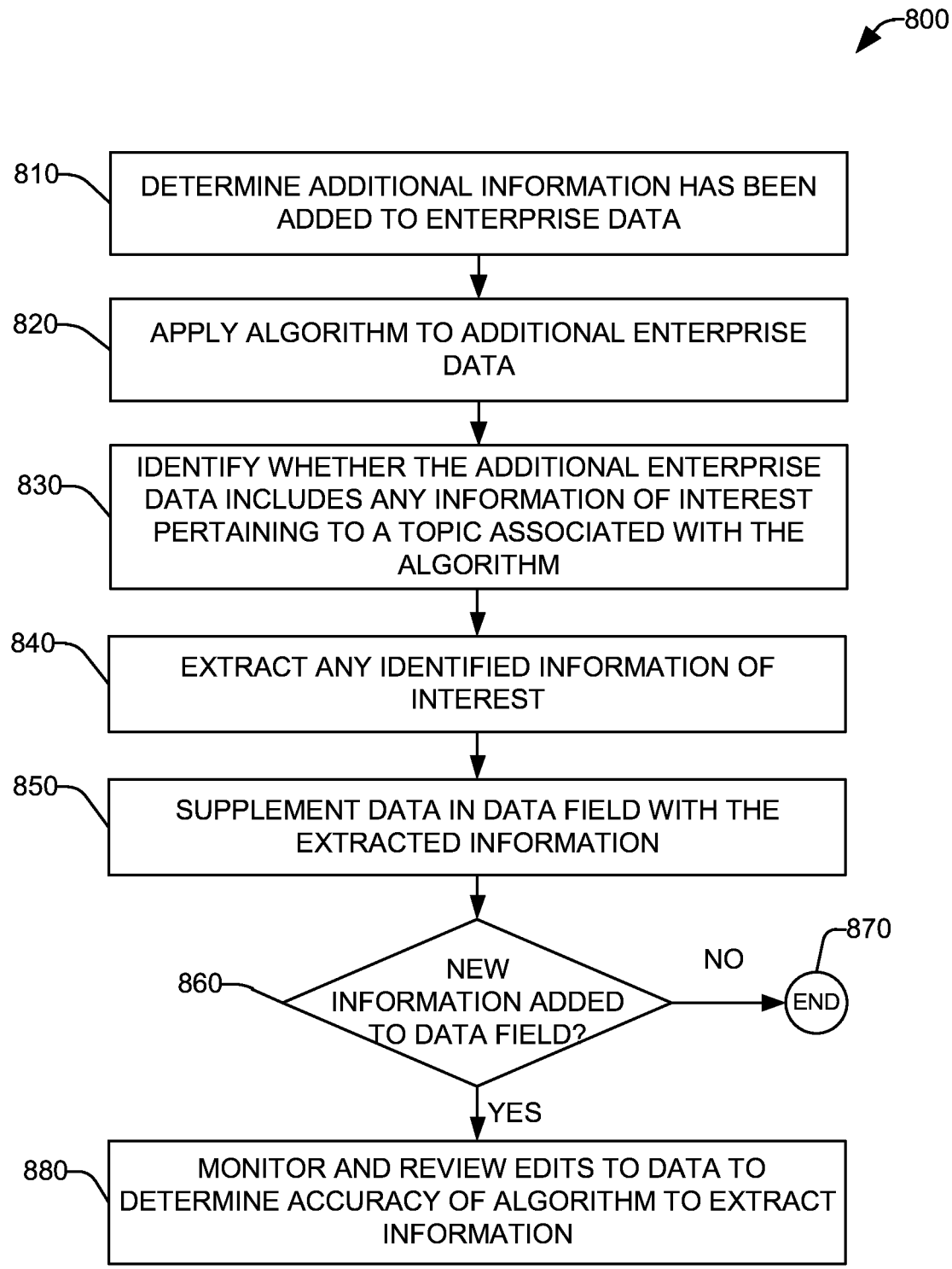
FIG. 8 is a flow diagram of a non-limiting computer implemented method for regenerating a document when additional information is available, in accordance with one or more embodiments described herein.

FIG. 8 presents a methodology 800 for regenerating a document when additional information is available, in accordance with one or more embodiments described herein.

At 810, a determination can be made that additional information (e.g., additional enterprise data 151A-n) is available in an enterprise data resource (e.g., to supplement enterprise data 150A-n) for review by an algorithm (e.g., algorithm 115A) configured to identify and extract information pertaining to a topic/subject matter of interest (e.g., topic 145).

At 820, the algorithm can be applied to the additional information in the enterprise data resource.

At 830, as previously described, during application of the algorithm to the additional information in the enterprise data resource any information pertaining to the topic/subject matter of interest can be identified.

At 840, any information identified by the algorithm as pertaining to the topic/subject matter of interest can be extracted.

At 850, the extracted information can be applied to the data field (e.g., data field 130A) pertaining to the topic. In a first scenario, the data field may be empty and no information of interest was identified by the algorithm when applied to the initial enterprise data, accordingly, the newly identified information can populate the data field. In a second scenario, the data field may already contain information identified as being of interest by the algorithm when applied to the initial enterprise data, accordingly, the newly identified information can be added/supplement/overwrite the data previously extracted and populating the data field.

At 860, a determination can be made whether new information has been added to the data field, e.g., as a function of step 850. In the event of NO new information has been added to the data field, methodology 800 can end at 870.

At 880, in response to determining that YES, the data field was updated with the newly extracted information, methodology can advance to 880, wherein any edits made to the information in the data field can be further monitored to determine an effectiveness of the algorithm to identify and extract information pertaining to a topic/subject matter of interest (e.g., as described in at least FIGS. 1, 2, 3, 7).

Figure 9:
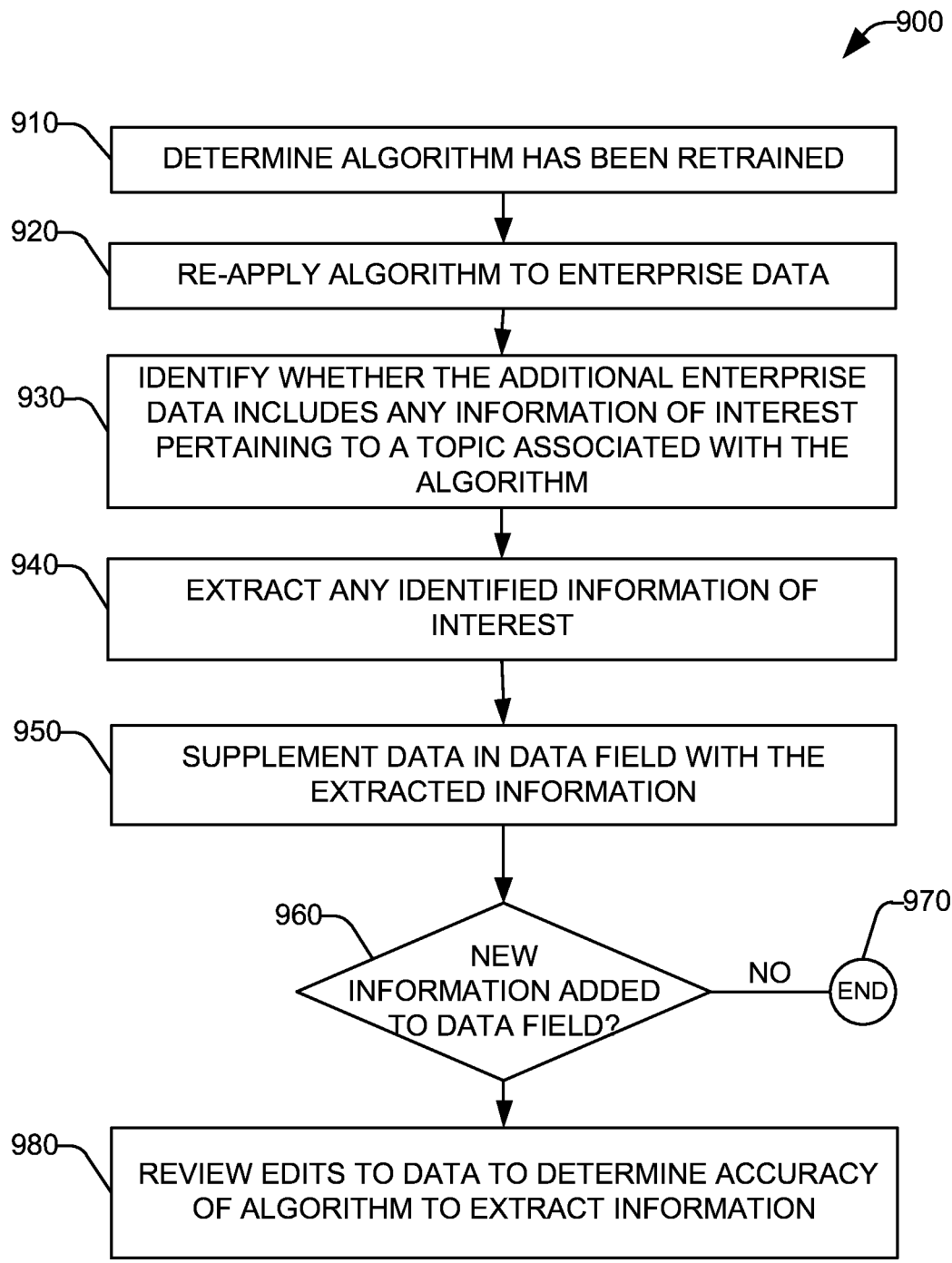
FIG. 9 is a flow diagram of a non-limiting computer implemented method for regenerating a document when an algorithm utilized to extract information from enterprise data has been retrained, in accordance with one or more embodiments described herein

FIG. 9 presents a methodology 900 for regenerating a document when an algorithm utilized to extract information from enterprise data has been retrained, in accordance with one or more embodiments described herein.

At 910, a determination can be made that an algorithm (e.g., algorithm 115A) has been retrained, e.g., as a result of the algorithm not identifying information available in an enterprise resource (e.g., enterprise data 150A-n) that may potentially pertain to a topic and/or subject matter (e.g., topic 145) that the algorithm is configured to locate.

At 920, the retrained algorithm can be re-applied to the additional information (e.g., additional enterprise data 151A-n) in the enterprise data resource.

At 930, as previously described, during application of the retrained algorithm to the additional information in the enterprise data resource any information pertaining to the topic/subject matter of interest can be identified.

At 940, any information identified by the retrained algorithm as pertaining to the topic/subject matter of interest can be extracted.

At 950, the extracted information can be applied to the data field (e.g., data field 130A). In a first scenario, the data field may be empty and no information of interest was identified by the algorithm when applied to the initial enterprise data, accordingly, the newly identified information can populate the data field. In a second scenario, the data field may already contain information identified as being of interest by the algorithm when applied to the initial enterprise data, accordingly, the newly identified information can be added/supplement/overwrite the data previously extracted and populating the data field.

At 960, a determination can be made whether new information has been added to the data field, e.g., as a function of step 950. In the event of NO new information has been added to the data field, methodology 900 can end at 970.

At 980, in response to determining that YES, the data field was updated with the newly extracted information, methodology can advance to 980, wherein any edits made to the information in the data field can be further monitored (e.g., by editor component 170) to determine an effectiveness of the retrained algorithm to identify and extract information pertaining to a topic/subject matter of interest.

Example Applications and Use

Figure 10:
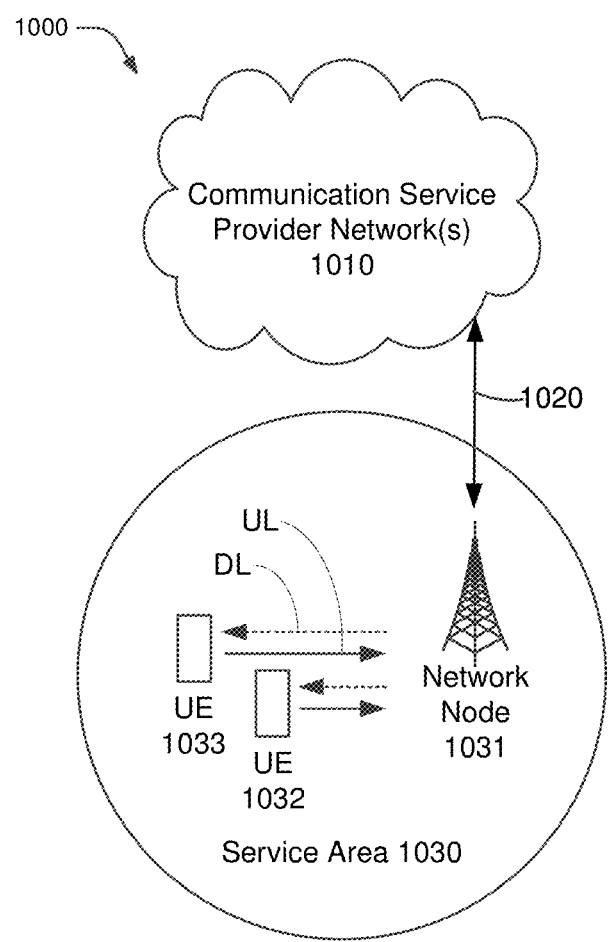
FIG. 10 illustrates an example wireless communication system, in accordance with one or more embodiments described herein.

FIG. 10 illustrates an example wireless communication system 1000, in accordance with one or more embodiments described herein. The example wireless communication system 1000 comprises communication service provider network(s) 1010, a network node 1031, and user equipment (UEs) 1032, 1033. A backhaul link 1020 connects the communication service provider network(s) 1010 and the network node 1031. The network node 1031 can communicate with UEs 1032, 1033 within its service area 1030. The dashed arrow lines from the network node 1031 to the UEs 1032, 1033 represent downlink (DL) communications to the UEs 1032, 1033. The solid arrow lines from the UEs 1032, 1033 to the network node 1031 represent uplink (UL) communications.

In general, with reference to FIG. 10, the non-limiting term "user equipment" can refer to any type of device that can communicate with network node 1031 in a cellular or mobile communication system 1000. UEs 1032, 1033 can have one or more antenna panels having vertical and horizontal elements. Examples of UEs 1032, 1033 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 1032, 1033 can also comprise IOT devices that communicate wirelessly.

In various embodiments, system 1000 comprises communication service provider network(s) 1010 serviced by one or more wireless communication network providers. Communication service provider network(s) 1010 can comprise a "core network". In example embodiments, UEs 1032, 1033 can be communicatively coupled to the communication service provider network(s) 1010 via a network node 1031. The network node 1031 can communicate with UEs 1032, 1033, thus providing connectivity between the UEs 1032, 1033 and the wider cellular network. The UEs 1032, 1033 can send transmission type recommendation data to the network node 1031. The transmission type recommendation data can comprise a recommendation to transmit data via a closed loop multiple input multiple output (MIMO) mode and/or a rank-1 precoder mode.

Network node 1031 can have a cabinet and other protected enclosures, computing devices, an antenna mast, and multiple antennas for performing various transmission operations (e.g., MIMO operations) and for directing/steering signal beams. Network node 1031 can comprise one or more base station devices which implement features of the network node. Network nodes can serve several cells, depending on the configuration and type of antenna. In example embodiments, UEs 1032, 1033 can send and/or receive communication data via wireless links to the network node 1031.

Communication service provider networks 1010 can facilitate providing wireless communication services to UEs 1032, 1033 via the network node 1031 and/or various additional network devices (not shown) included in the one or more communication service provider networks 1010. The one or more communication service provider networks 1010 can comprise various types of disparate networks, including but not limited to: cellular networks, femto networks, picocell networks, microcell networks, internet protocol (IP) networks Wi-Fi service networks, broadband service network, enterprise networks, cloud-based networks, millimeter wave networks and the like. For example, in at least one implementation, system 1000 can be or comprise a large-scale wireless communication network that spans various geographic areas. According to this implementation, the one or more communication service provider networks 1010 can be or comprise the wireless communication network and/or various additional devices and components of the wireless communication network (e.g., additional network devices and cell, additional UEs, network server devices, etc.).

The network node 1031 can be connected to the one or more communication service provider networks 1010 via one or more backhaul links 1020. The one or more backhaul links 1020 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 1020 can also comprise wireless link components, such as but not limited to, line-of-sight (LOS) or non-LOS links which can comprise terrestrial air-interfaces or deep space links (e.g., satellite communication links for navigation). Backhaul links 1020 can be implemented via a "transport network" in some embodiments. In another embodiment, network node 1031 can be part of an integrated access and backhaul network. This may allow easier deployment of a dense network of self-backhauled 5G cells in a more integrated manner by building upon many of the control and data channels/procedures defined for providing access to UEs 1032, 1033.

Wireless communication system 1000 can employ various cellular systems, technologies, and modulation modes to facilitate wireless radio communications between devices (e.g., the UEs 1032, 1033 and the network node 1031). While example embodiments might be described for 5G new radio (NR) systems, the embodiments can be applicable to any radio access technology (RAT) or multi-RAT system where the UE operates using multiple carriers, e.g., LTE FDD/TDD, GSM/GERAN, CDMA2000 etc.

For example, system 1000 can operate in accordance with any 5G, next generation communication technology, or existing communication technologies, various examples of which are listed supra. In this regard, various features and functionalities of system 1000 are applicable where the devices (e.g., the UEs 1032, 1033 and the network node 1031) of system 1000 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 1000 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMDs), etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example, several hundreds of thousands of simultaneous connections to be supported for massive sensor deployments; improved coverage, enhanced signaling efficiency; reduced latency compared to LTE.

The 5G access network can utilize higher frequencies (e.g., >6 GHZ) to aid in increasing capacity. Currently, much of the millimeter wave (mm Wave) spectrum, the band of spectrum between 30 GHz and 300 GHz is underutilized. The millimeter waves have shorter wavelengths that range from 9 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are in use in 5G systems.

Figure 11:
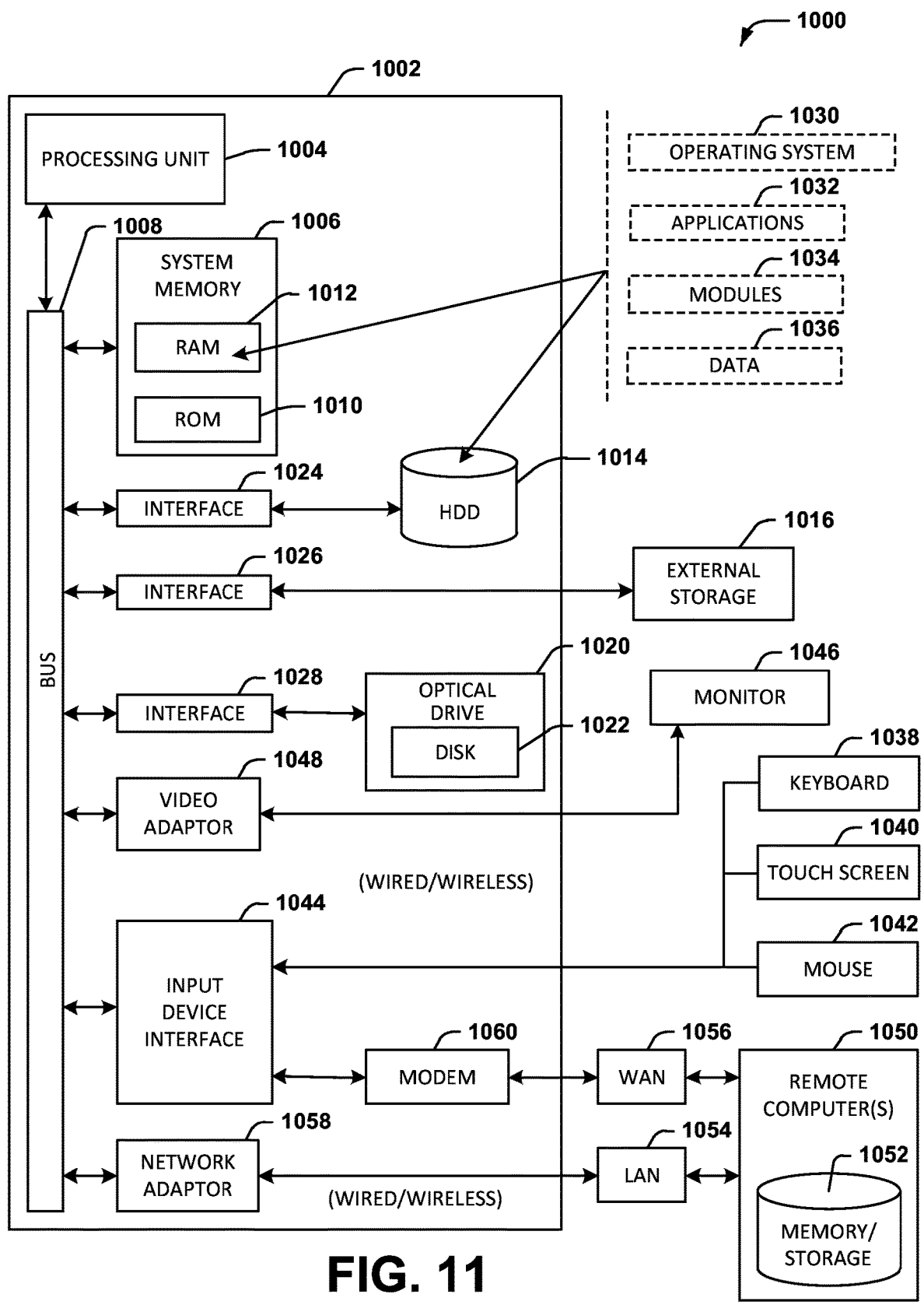
FIG. 11 illustrates a block diagram of an example computer operable to execute one or more embodiments presented herein.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors and may include a cache memory. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid-state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can comprise a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device." "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "client entity." "consumer," "client entity." "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments are described herein in the context of 5G or other next generation networks, the disclosed aspects are not limited to a 5G implementation, and can be applied in other network next generation implementations, such as sixth generation (6G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), 5G, third generation partnership project 2 (3GPP2), ultra-mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   a memory configured to store computer executable components; and
   a processor configured to execute at least one of the computer executable components that:
   trains, using a set of training data, a machine learning model to generate content for data fields of a document template for a topic, wherein the machine learning model comprises a respective algorithm for each of the data fields, and wherein the set of training data comprises:
   the document template for the topic,
   training documents that comply with the document template for the topic, and
   at least one of documents, emails, or correspondence associated with the topic communicated between people in an enterprise associated with the document template;
   generate, using the machine learning model, a machine generated document based on the document template, wherein at least one data field of the data fields of the machine generated document contains respective content generated by the machine learning model;

monitors respective edits, made by one or more of the people, to the respective content in the at least one data field of the machine generated document;

determines, from the respective edits, respective accuracies of the algorithms associated with the at least one data field to generate the respective content; and based on determining that a respective accuracy for at least one of the algorithms does not meet a threshold accuracy:

generates an enterprise social graph of the people in the enterprise, retrains, using the set of training data and the enterprise social graph, the machine learning model to generate the content for the data fields of the document template for the topic, wherein the retraining is based on respective distances in the enterprise social graph between first people mentioned in the set of training data associated with respective data fields associated with the at least one of the algorithms that does not meet the threshold accuracy and second people that edited the respective data fields associated with the at least one of the algorithms that does not meet the threshold accuracy.

2. The system of claim 1, wherein the respective accuracy of an algorithm meeting the threshold accuracy indicates minimal editing of the respective content has been conducted and the algorithm accurately identified information pertaining to the topic from one or more sources; and wherein the respective accuracy of the algorithm not meeting the threshold accuracy indicates extensive editing of the respective content has been conducted and the algorithm failed to accurately identify the information pertaining to the topic from the one or more sources.

3. The system of claim 2, the operations further comprising storing the respective edits made to the machine generated document.

4. The system of claim 1, wherein the data fields are automatically combined to create the machine generated document in response to selection of the topic.

5. The system of claim 4, wherein the data fields are selected from a library of data fields, and combined in accordance with the document template to create the machine generated document in accordance with the topic.

6. The system of claim 1, wherein the machine generated document is a purpose-specific document.

7. The system of claim 6, wherein the purpose-specific document is one of a cybersecurity incident report, a safety report, a product safety report, a root-cause analysis (RCA) report, a software architecture documentation, a product change request, or a Securities and Exchange Commission (SEC) report.

8. The system of claim 1, wherein data field included in the machine generated document in response to selection of the topic is also included in a machine generated second document generated in response to selection of a second topic, wherein subject matter of the topic and subject matter of the second topic are disparate.

9. A method comprising:

training, by a system comprising a processor, using a set of training data, a machine learning model to generate content for data fields of a document template for a topic, wherein the machine learning model comprises a respective algorithm for each of the data fields, and wherein the set of training data comprises:

the document template for the topic, training documents that comply with the document template for the topic, and at least one of documents, emails, or correspondence associated with the topic communicated between people in an enterprise associated with the document template;

generating, by the system, using the machine learning model, a machine generated document based on the document template, wherein at least one data field of the data fields of the machine generated document contains respective content generated by the machine learning model;

monitoring, by the system, respective edits, made by one or more of the people, to the respective content in the at least one data field of the machine generated document;

determining, by the system, from the respective edits, respective accuracies of the algorithms associated with the at least one data field to generate the respective content; and based on determining that a respective accuracy for at least one of the algorithms does not meet a threshold accuracy:

generating, by the system, an enterprise social graph of the people in the enterprise, retraining, by the system, using the set of training data and the enterprise social graph, the machine learning model to generate the content for the data fields of the document template for the topic, wherein the retraining is based on respective distances in the enterprise social graph between first people mentioned in the set of training data associated with respective data fields associated with the at least one of the algorithms that does not meet the threshold accuracy and second people that edited the respective data fields associated with the at least one of the algorithms that does not meet the threshold accuracy.

10. The method of claim 9, wherein the respective accuracy of an algorithm meeting the threshold accuracy indicates minimal editing of the respective content has been conducted and the algorithm accurately identified information pertaining to the topic from at least one source; and wherein the respective accuracy of the algorithm not meeting the threshold accuracy indicates extensive editing of the respective content has been conducted and the algorithm failed to accurately identify the information pertaining to the topic from the at least one source.

11. The method of claim 9, wherein the data fields are automatically combined to create the machine generated document in response to selection of the topic.

12. The method of claim 9, wherein the data fields are selected from a library of data fields, and combined in accordance with the document template to create the machine generated document in accordance with the topic.

13. The method of claim 9, wherein the machine generated document is a purpose-specific document.

14. The method of claim 13, wherein the purpose-specific document is one of a cybersecurity incident report, a safety report, a product safety report, a root-cause analysis (RCA) report, a software architecture documentation, a product change request, or a Securities and Exchange Commission (SEC) report.

15. A non-transitory machine-readable medium, comprising executable instructions that, when executed by a processor, facilitate performance of operations, the operations comprising:
- training, using a set of training data, a machine learning model to generate content for data fields of a document template for a topic, wherein the machine learning model comprises a respective algorithm for each of the data fields, and wherein the set of training data comprises:
  - the document template for the topic,
  - training documents that comply with the document template for the topic, and
  - at least one of documents, emails, or correspondence associated with the topic communicated between people in an enterprise associated with the document template;
- generating, using the machine learning model, a machine generated document based on the document template, wherein at least one data field of the data fields of the machine generated document contains respective content generated by the machine learning model;
- monitoring respective edits, made by one or more of the people, to the respective content in the at least one data field of the machine generated document;
- determining, from the respective edits, respective accuracies of the algorithms associated with the at least one data field to generate the respective content; and
- based on determining that a respective accuracy for at least one of the algorithms does not meet a threshold accuracy:
  - generating an enterprise social graph of the people in the enterprise,
  - retraining, using the set of training data and the enterprise social graph, the machine learning model to generate the content for the data fields of the document template for the topic, wherein the retraining is based on respective distances in the enterprise social graph between first people mentioned in the set of training data associated with respective data fields associated with the at least one of the algorithms that does not meet the threshold accuracy and second people that edited the respective data fields associated with the at least one of the algorithms that does not meet the threshold accuracy.

16. The non-transitory machine-readable medium of claim 15, wherein the respective accuracy of an algorithm meeting the threshold accuracy indicates minimal editing of the respective content has been conducted and the algorithm accurately identified information pertaining to the topic from at least one source; and
- wherein the respective accuracy of the algorithm not meeting the threshold accuracy indicates extensive editing of the respective content has been conducted and the algorithm failed to accurately identify the information pertaining to the topic from the at least one source.

17. The non-transitory machine-readable medium of claim 15, wherein the data fields are automatically combined to create the machine generated document in response to selection of the topic.

18. The non-transitory machine-readable medium of claim 15, wherein the data fields are selected from a library of data fields, and combined in accordance with the document template to create the machine generated document in accordance with the topic.

19. The non-transitory machine-readable medium of claim 15, wherein the machine generated document is a purpose-specific document.

20. The non-transitory machine-readable medium of claim 19, wherein the purpose-specific document is one of a cybersecurity incident report, a safety report, a product safety report, a root-cause analysis (RCA) report, a software architecture documentation, a product change request, or a Securities and Exchange Commission (SEC) report.

* * * * *